United States Patent [19]

Pagdin

[11] 3,923,113
[45] Dec. 2, 1975

[54] FOUR WHEEL DRIVE VEHICLES

[75] Inventor: Brian Colin Pagdin, Sutton Coldfield, England

[73] Assignee: GKN Transmissions Limited, Birmingham, England

[22] Filed: June 21, 1973

[21] Appl. No.: 372,450

[30] Foreign Application Priority Data
June 21, 1972 United Kingdom............... 28975/72
Aug. 26, 1972 United Kingdom............... 39897/72

[52] U.S. Cl................ 180/44 R; 74/711; 192/82 T; 192/57
[51] Int. Cl.² .................... B60K 17/34; B60K 23/04
[58] Field of Search... 180/44 R, 44 F, 44 M, 24.09; 192/57, 82 T, 35

[56] References Cited
UNITED STATES PATENTS

| | | | |
|---|---|---|---|
| 2,320,900 | 6/1943 | Walz | 192/82 T |
| 2,402,229 | 6/1946 | Johnson | 192/82 T |
| 3,261,230 | 7/1966 | Rudnicki | 192/82 T |
| 3,300,002 | 1/1967 | Roper | 192/57 X |
| 3,481,436 | 12/1969 | Wilkowski | 192/57 X |
| 3,534,633 | 10/1970 | Chocholek | 180/44 R |
| 3,739,891 | 6/1973 | La Flame | 192/82 T |
| 3,762,241 | 10/1973 | Roper | 192/35 |

*Primary Examiner*—Leo Friaglia
*Attorney, Agent, or Firm*—Spencer & Kaye

[57] ABSTRACT

A four-wheel-drive vehicle including a prime mover, front and rear wheels drivable by the prime mover, a drive connection between the front and rear wheels, a torque transmitting device having two relatively rotatable parts arranged so that the ratio of input torque to output torque of the device is not at all times equal to the ratio of output speed to input speed of the device, one of said parts of the device being connected with the front wheels and the other of said parts of the device being connected with the rear wheels so that when a speed differential arises between the front and rear wheels said parts of the device rotate relative to each other to transmit torque between the parts thus diverting part of the prime mover torque from the faster rotating wheels to the slower rotating wheels, and a temperature sensitive element arranged, when the temperature of the torque transmitting device reaches a predetermined value resulting from relative rotation of said parts thereof in response to a speed differential between the front and rear wheels, to cause a reduction in the speed of relative rotation of said parts so as to reduce the amount of energy converted into heat in the torque transmitting device.

8 Claims, 11 Drawing Figures

FOUR WHEEL DRIVE VEHICLES

This invention relates to four-wheel-drive vehicles, hereinafter referred to as being of the kind specified, including a prime mover, front and rear wheels drivable by the prime mover, a drive connection between the front and rear wheels and a torque transmitting device in the drive connection in which device the ratio of input torque to output torque of the device does not at all times equal the ratio of output speed to input speed of the device. Examples of such torque transmitting devices are viscous shear couplings and fluid pumps.

The purpose of such a torque transmitting device is to control the speed difference between the front and rear wheels by diverting a fraction of the available prime mover torque from one pair of wheels to the other. If, however, such a vehicle is placed in a position in which there can be an excessive speed difference between the front and rear wheels, e.g. if the rear wheels of the vehicle are in a ditch and spinning freely and the torque is diverted by the device to the front wheels, and if there is insufficient torque available to extricate the vehicle and if, furthermore, the driver continues for some time to try and extricate the vehicle, a great deal of heat will be generated in the torque transmitting device due to said excessive speed difference with the consequent danger of the failure of the device.

It is an object of the invention to provide a four-wheel-drive vehicle of the kind specified in which the problem of the failure of the torque transmitting device due to energy dissipation therein is reduced.

According to the invention we provide a four-wheel-drive vehicle including a prime mover, front and rear wheels drivable by the prime mover, a drive connection between the front and rear wheels, a torque transmitting device having two relatively rotatable parts arranged so that the ratio of input torque to output torque of the device is not at all times equal to the ratio of output speed to input speed of the device, one of said parts of the device being connected with the front wheels and the other of said parts of the device being connected with the rear wheels so that when a speed differential arises between the front and rear wheels said parts of the device rotate relative to each other to transmit torque between the parts thus diverting part of the prime mover torque from the faster rotating wheels to the slower rotating wheels, and a temperature sensitive element arranged, when the temperature of the torque transmitting device reaches a predetermined value resulting from relative rotation of said parts thereof in response to a speed differential between the front and rear wheels, to cause a reduction in the speed of relative rotation of said parts so as to reduce the amount of energy converted into heat in the torque transmitting device.

The action taken to reduce the amount of energy converted into heat within the device will depend upon the construction of the torque transmitting device. If, for example, the device is a viscous shear coupling having two series of interleaved annular discs, one series being connected with the front wheels and the other series being connected with the rear wheels, then the discs may be moved closer together, thus bringing said torque and speed ratios closer and reducing the energy dissipated, or alternatively the discs may be brought into frictional contact in order to give a direct drive connection between the front and rear wheels.

A temperature sensitive element in the form of a bi-metallic element may be arranged to bear on one end of the interleaved series of discs and to force the adjacent discs closer together or into frictional contact as the temperature of the device rises. Conveniently the bimetallic element may comprise a corrugated bimetallic ring the corrugations projecting axially relative to the discs so that as the temperature of the coupling rises the corrugations deepen thus forcing adjacent discs together. Alternatively, the temperature sensitive element may comprise an expansible chamber containing a material such as a higher paraffin wax which is arranged to expand and force the adjacent discs together as the temperature rises.

In another arrangement the torque transmitting device is in the form of a pump which pumps liquid against a resistance, one part of the pump being connected with the front wheels and the other part of the pump being connected with the rear wheels. In such an arrangement, means are provided for increasing the resistance to pumping on the attainment of said predetermined temperature, preferably to the point where the pump is stalled so that there will be a direct driving connection between the pump parts and therefore through the device. By way of example the pump may be caused to stall by closing a valve in the pump outlet, the valve being operated either electrically or mechanically upon the attainment of said predetermined temperature.

As an alternative, a normally disengaged clutch may be connected kinematically in parallel with the torque transmitting device so as to form an alternative torque transmitting path between the front and rear wheels, the temperature sensitive element being arranged to cause the clutch to engage when the temperature of the device reaches the predetermined value thus relieving the device of its torque transmitting duty.

In any of the foregoing examples the torque transmitting device may be arranged in association with an inter-axle differential to control the speed difference between the front and rear wheels of the vehicle.

The invention will now be described in detail by way of example, with reference to the accompanying drawings in which.

Figure 1:
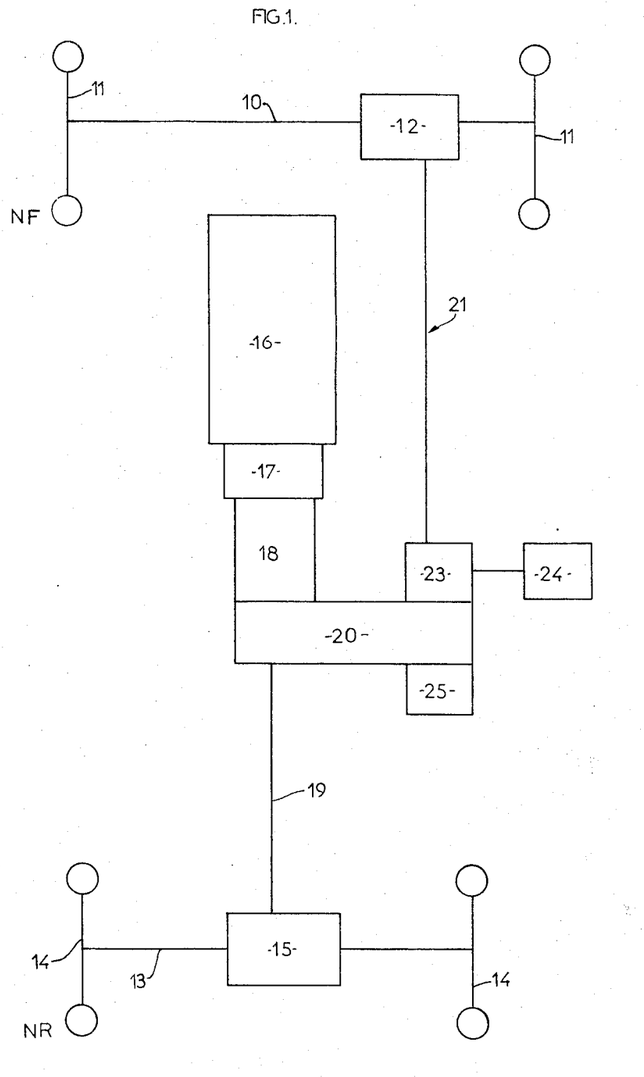
FIG. 1 is a diagrammatic illustration of one form of four-wheel-drive vehicle embodying the present invention.
Figure 2:
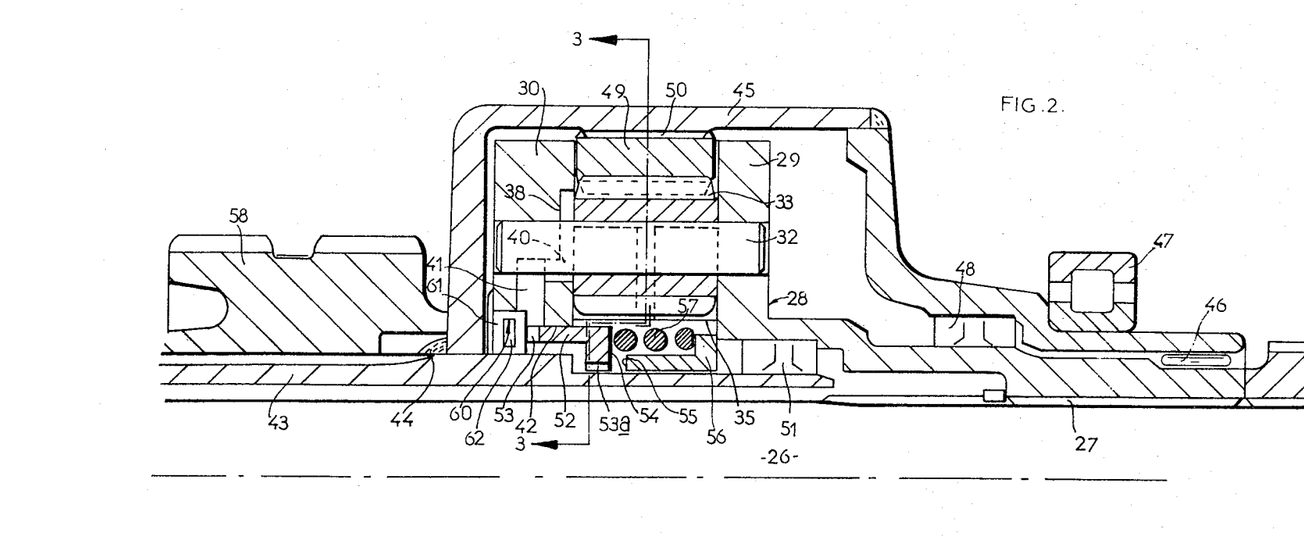
FIG. 2 and FIG. 3 are longitudinal and transverse sectional views respectively through a planetary pump for use as a torque transmitting device in a four-wheel-drive vehicle in accordance with the present invention.
Figure 3:
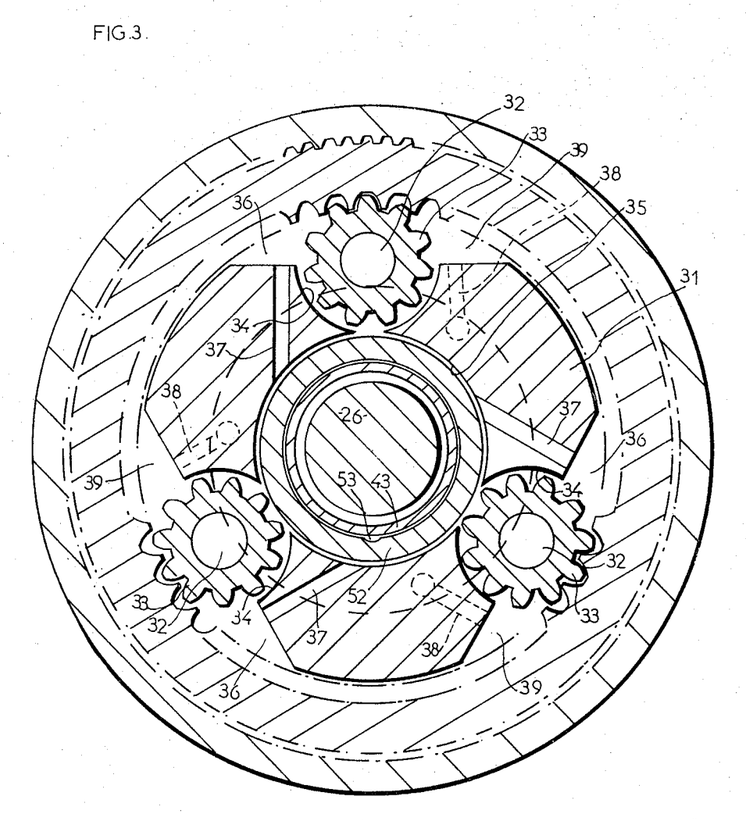

Referring now to FIG. 1, this shows a four-wheel-drive vehicle having a front axle 10 carrying drivable wheels 11 and having an inter-wheel differential gear 12. The vehicle also has a rear axle 13 having drivable wheels 14 and an inter-wheel differential gear 15. The vehicle has a prime mover 16 which drives, through a disengageable clutch 17, a change speed means or gear box 18. The gear box has an input which is connectable to the prime mover 16 through the clutch 17 and an output which drives a first drive connection 19 which is interposed between the gear box 18 and the inter-wheel differential gear 15. A transfer gear box 20 transmits drive from the first drive connection via a torque transmitting device in the form of a pump unit 23, to a second drive connection indicated generally at 21 and which is connected to the differential gear 12 of the front axle 10. The pump, which is shown in FIGS. 2 and 3 and is described in detail below, is of the planetary type, is driven from the transfer box 20 is connected with the second drive connection 21. The pump unit is so arranged that when there is relative rotation between the annulus gear and the planet carrier, resulting from the existence of a speed differential between the front and rear wheels, the annulus gear and planet gears co-act to pump a non-gaseous fluid around a path whose resistance can be varied by a variable orifice means 24 which is operated automatically as described below.

An anti-skid braking sensor 25 is connected to the second drive connection 21.

Under normal conditions, with no more than normal slip between the wheels 11 and 14 and the road surface the vehicle is driven solely by the rear wheels 14 through the first drive connection 19. The transfer box 20 will be arranged such that the annulus gear and planet carrier of the pump unit 23 will be rotating at substantially the same speed and therefore little or no fluid will be pumped. If, for example, the rear wheels 14 start to spin relative to the front wheels 11 then there will be relative rotation between the annulus gear and planet carrier of the pump unit 23 and fluid will be pumped by the pump unit through the control means 24 which will exert a resistance against the pumping of the fluid. The resultant reaction will cause torque to be transmitted through the pump unit and therefore some of the torque previously applied to the rear wheels will be applied to the front wheels via the first and second drive connections 19 and 22 and the pump 23. The torque redirected to the front wheels from the rear wheels will reduce the torque applied to the latter and thus prevent spinning of the rear wheels.

Referring now to FIGS. 2 and 3, these show one form of planetary pump which may be used and which incorporates variable orifice means for automatically increasing the pumping resistance when the temperature of the pump or the fluid being pumped rises above a predetermined value.

The pump comprises an input shaft 26 which is splined at 27 to a planet carrier indicated generally at 28. The planet carrier has end plates 29 and 30 between which is a central body 31. Between the plates 29 and 30 extend pins 32 on which are mounted planet gears 33. There are three such pins and gears and each gear is mounted in a pocket 34 in the body 31. The body has a central bore 35 and extending between the bore 35 and lateral extensions 36 of the pockets 34 are passages 37. The end plate 30 is provided with three slots 38 which communicate with further lateral extensions 39 of the pockets 34 and through holes 40 with an annular groove 41 in the plate. The latter has an annular recess 42 at its inner periphery which communicates with the groove 41.

An output shaft is indicated at 43 and has welded thereto at 44 a housing 45 within which the planet carrier is mounted. The right hand end of the housing is mounted in bearings 46 and 47, the former being between the housing 45 and the planet carrier 28. A fluid seal 48 is also provided between the housing and the planet carrier. The housing carries an annulus gear 49 which is splined thereto at 50 and which extends between the end plates 29 and 30 with small clearance. It will be appreciated that as relative rotation takes place between the input and output shafts 26 and 43 respectively the planet gears will be caused to rotate.

A fluid seal 51 is provided between the planet carrier 28 and the output shaft 43 and a valve member, indicated generally at 52 and which is in the form of an annulus of L section, is mounted in the annular recess 42 in the end plate 30 and in the bore 35 of the body 31. The valve member 52 is provided with two series of channels 53 and 53a to permit the flow of fluid between the groove 41 and the bore 35. The right hand face 54 in FIG. 2 of the valve member 52 is arranged to cooperate with the left hand face 55 of an L-shaped annular abutment 56. A spring 57 is interposed between the abutment 56 and the valve member 52 and urges the latter to the left in FIG. 2. A temperature sensitive element 60 in the form of an expansible chamber 61 containing a higher paraffin wax 62 is positioned in the groove 41 between the end plate 30 and the valve member 52.

During operation of the pump during forward movement of the vehicle, that is upon relative rotation between the shafts 26 and 43 due to a speed differential existing between the front and rear wheels of the vehicle, fluid contained in the housing 45 is pumped by the planet gears 33, which rotate clockwise, from the bore 35, along the passages 37, through the extensions 36, around the pockets 34, through the extensions 39, slots 38 and holes 40 to the groove 41 through the channel 53 and between the faces 54 and 55 to the bore 35. It will thus be seen that the fluid is circulated through orifice means constituted by the gap between the faces 54 and 55 which are urged apart by the spring 57. The pumping resistance of the fluid circuit is arranged to be controlled by the spacing between the faces 54 and 55.

If the operation of the pump is continued for any appreciable length of time a considerable amount of heat will be generated in the pump. The temperature sensitive element is arranged, as the temperature of the pump rises, to expand thus moving the valve member 52 to the right, as shown in FIG. 2, thereby bringing the faces 53 and 54 closer together so as to further restrict the flow of fluid and reduce the relative rotation of shaft 26 and 43. This results in a reduction in the amount of energy converted into heat in the pump. The temperature characteristics of the temperature sensitive element are preferably chosen so that comparatively little movement of the valve member occurs until the pump reaches a predetermined temperature whereupon the valve member is moved sufficiently to stall the pump and obtain a direct drive connection between shafts 26 and 43.

If, desired, other substances may be used as the temperature sensing medium in place of wax. For example, a vapour which boils at the predetermined temperature may be used.

In the embodiment of FIG. 1, the input shaft 26 is connected to the transfer gear box 20 and the output shaft 43 is connected, for example by means of chains engaged around a sprocket 58 on the shaft 43, with the second drive connection 21.

Figure 4:
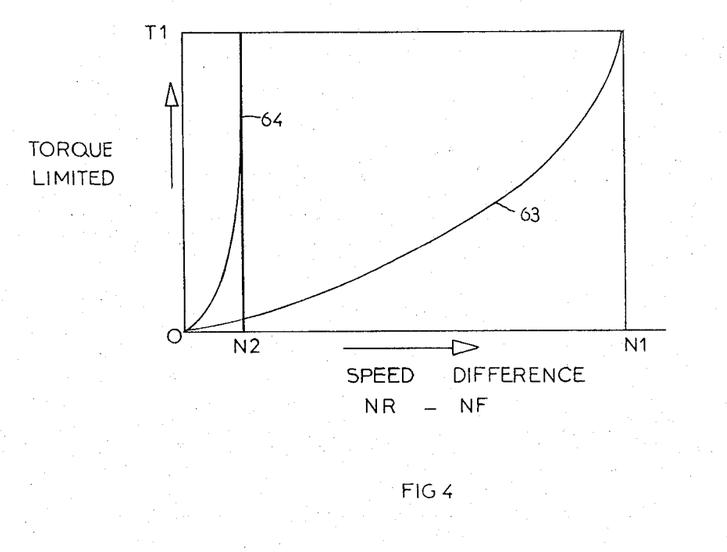
FIG. 4 is a graph illustrating the relation between the torque transmitted by the torque transmitting device shown in FIGS. 2 and 3 and the speed difference between the front and rear wheels of the vehicles.

Referring now to FIG. 4, the curve 63 indicates the normal relation between the torque transmitted by the pump 23 of the arrangement of FIG. 1 and the speed difference between the rear wheels and the front wheels, the speed of the rear wheels being indicated by $N_R$ and the speed of the front wheels by $N_F$. It will be seen that for the transmission of a torque $T_1$ there will normally be a speed difference of $N_1$. Curve 64 relates to the position when the pump is stalled by movement of the valve member 52. In this arrangement, the torque $T_1$ is transmitted with a very much smaller speed difference $N_2$. Since the amount of heat dissipated in the pump depends on the speed difference between the relatively rotating pump parts and since the torque remains constant at $T_1$, it will be seen that by stalling the pump the amount of torque transmitted can remain constant while the speed difference between the relatively rotating parts decreases and therefore the energy dissipated in heat in the pump decreases.

Various modifications may be made to the arrangement described above. For example, a four-wheel-drive vehicle could be provided with an inter-axle differential and a pump such as 23 could be connected between elements of the differential to control relative rotation between said parts and the pump can be provided with a valve member and temperature sensing means as described.

Figure 5:
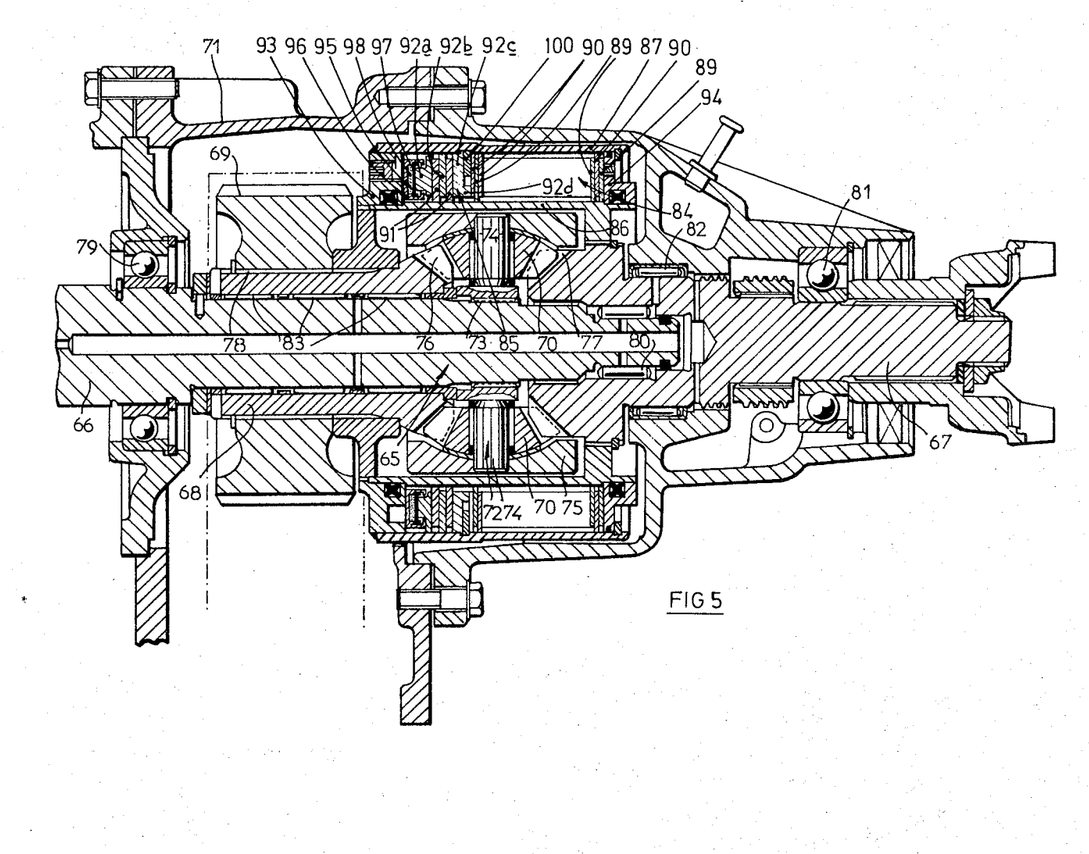
FIG. 5 is a longitudinal section through a differential unit incorporating a viscous shear coupling for use in a four-wheel-drive vehicle in accordance with the present invention.

In an alternative arrangement shown in FIG. 5, a four-wheel-drive vehicle is provided with an inter-axle bevel gear differential 65 provided with a housing 71 enclosing an input shaft 66 connected with the vehicle prime mover, not shown, a first output shaft 67 connected with the rear wheels of the vehicle and a second output shaft 68 connected with the front wheels of the vehicle via a sprocket 69. The input and output shafts are interconnected in the normal manner by four bevel pinions 70 carried on a support assembly comprising a cruciform member 72 which is splined to the input shaft 66 at 73 and incorporates four radially extending bevel pinion mounting pins 74 and an outer annular ring 75 which receives the ends of the pins 74. These bevel pinions mesh with bevel gears 76 and 77 formed on the inner ends of the two output shafts respectively. The sprocket 69 is splined to the output shaft 68 at 78. The input shaft 66 is supported at one end by a bearing 79 carried by the housing 71 and at the other end by a bearing 80 carried within the output shaft 67. The output shaft 67 is in turn supported within the housing on bearings 81 and 82. The output shaft 68 is supported on the input shaft 66 by needle rollers 83.

A viscous shear coupling 84 and multi-plate friction clutch 85 are connected kinematically in parallel between the two output shafts in the annular space between two co-axial cylindrical elements 86 and 87, the inner element 86 of which is connected to the output shaft 67 and the outer element 87 of which is connected to the output shaft 68.

The viscous shear coupling comprises a series of discs 89 keyed to the inner cylindrical element 86 and a series of discs 90 keyed to the outer cylindrical element 87. A suitable viscous medium is interposed between successive discs so as to establish a torque transmitting relation between the two series of discs while admitting of slip between these two series of discs.

The multi-plate clutch comprises a set of discs 91 keyed to the inner cylindrical element 86 and a set of discs 92a, 92b, 92c keyed to the outer cylindrical element 87. The discs 92a and 92c are made somewhat thicker than the central disc 92b and the disc 92c has an axially projecting flange 92d at its inner periphery abutting the adjacent disc 90 of the viscous shear coupling.

The annular space between the inner and outer cylindrical elements 86 and 87 is made fluid tight by two annular end plates 93 and 94. End plate 93 is welded at its outer periphery to the outer cylindrical element 87 and makes sealing contact at the inner periphery with the inner cylindrical element 86, while the end plate 94 makes sealing contact at its inner and outer peripheries with the inner and outer cylindrical elements respectively.

Between the plate 92a and the end plate 93 there is disposed a temperature sensitive element 95 in the form of a toroidal chamber defined by a rigid trough 96 closed by a flexible wall 97 made from for example viton or a suitable plastics material having the requisite degree of flexibility. This chamber contains a medium 98 such as a higher paraffin wax which will produce a pressure rise in the interior of the chamber which increases sharply at a predetermined temperature.

The temperature sensitive element is keyed to the outer cylindrical portion 87 so that the element and the plate 92a rotate together, there being thus no sliding frictional engagement between these components due to relative rotation between the cylindrical elements 86 and 87.

If, by reason of conditions such as previously mentioned, prolonged usage of the vehicle occurs with a substantial speed differential between the front and rear wheels, sufficient slip takes place in the viscous shear coupling to cause an excessive temperature rise, and heat is transmitted along the cylindrical elements 86 and 87 to the temperature sensitive element 95. At a predetermined temperature at which the pressure within the temperature sensitive element rises sharply, the discs 91 and 92a, 92b, 92c are subjected to axial compression between the temperature sensitive element 95 and an abutment ring 100 engaged in a groove in the outer cylindrical element 87 thereby producing engagement of the clutch and direct transmission through the clutch of torque between the elements 86 and 87 thus relieving the viscous shear coupling of its torque transmitting duty.

It will, of course, be understood that although the pressure rise is rapid, there will be an intervening stage between the released condition of the clutch and the fully engaged condition, at which some slip takes place between the discs 91 and the discs 92a to 92c such slip producing an additional complement of heat within the clutch itself. This is transmitted through the plates 92a to the temperature sensitive element 95 producing an additional temperature rise which still further increases the pressure and establishes the clutch discs in positive non-slipping engagement with each other.

This ensures that the clutch will remain engaged for a sufficient period of time for the viscous shear coupling to cool appreciably below the temperature value which initially produced operation of the temperature sensitive element and consequently the system is stable, i.e. does not hunt between the engaged and disengaged conditions of the clutch.

Instead of using a "wax" as the temperature sensing medium, the medium may be a vapour which boils at the predetermined temperature to provide the required sharp pressure rise.

Figure 6:
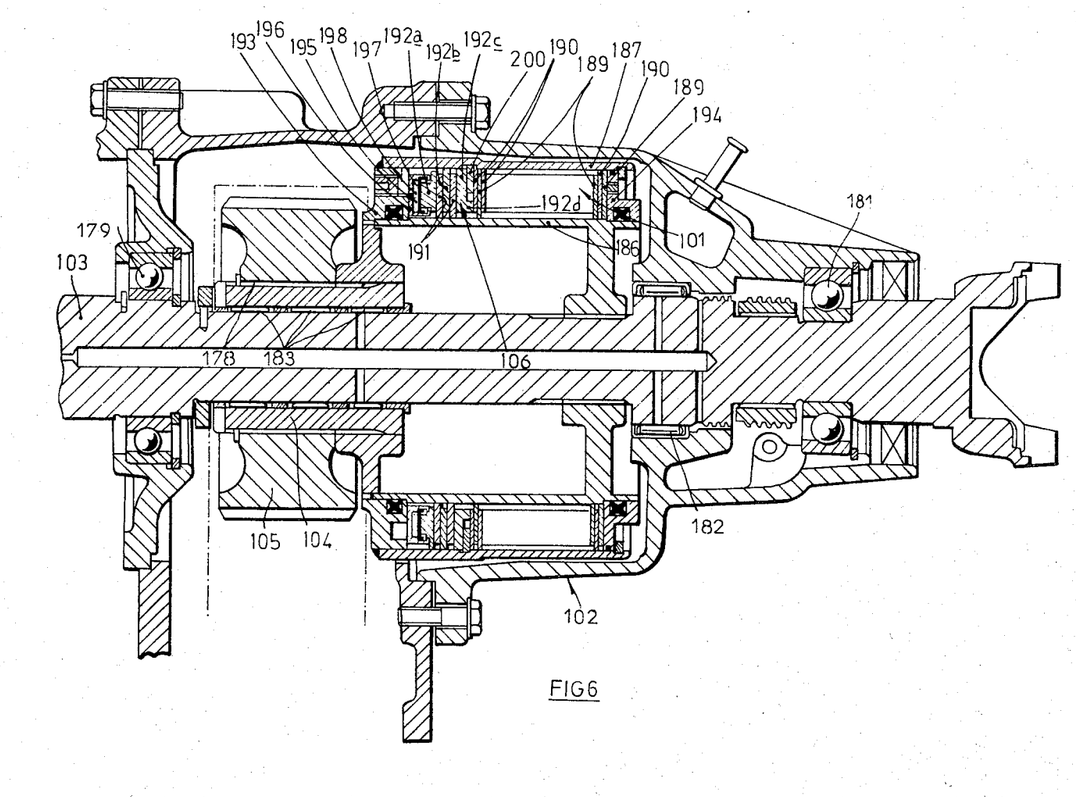
FIG. 6 is a longitudinal section through a viscous shear coupling and clutch arrangement for use in a four-wheel-drive vehicle in accordance with the present invention.

In a further alternative arrangement shown in FIG. 6, the front and rear wheels of a four-wheel-drive vehicle are interconnected via a viscous shear coupling 101 provided with a housing 102 enclosing an input shaft 103 connecting the prime mover and the rear wheels and an output shaft 104 connected with the front wheels via a sprocket 105. A friction clutch 106 is also connected kinematically in parallel with the viscous shear coupling to give a similar arrangement to the clutch and shear coupling arrangement shown in FIG. 5. The input shaft 103 is connected with an inner cylindrical element 186 and the output shaft 104 is connected with an outer cylindrical element 187. The shear coupling and clutch are disposed in the annular space between these cylindrical elements in a similar manner to that shown in FIG. 5 and similar components to those shown in FIG. 5 have therefore been numbered with reference numerals 100 greater than that used in connection with FIG. 5.

In the arrangement shown in FIG. 6, drive is normally only transmitted to the rear wheels via the shaft 103 and, in the event of a speed differential existing between the front and rear wheels, torque is transmitted to the front wheels via the shear coupling 101. As described previously with reference to FIG. 5, if excessive heat is generated in the shear coupling the temperature sensitive element 195 operates to bring the clutch discs into engagement thus providing a direct drive connection between the front and rear wheels.

If desired the encapsulated wax temperature sensing medium shown in FIG. 6 may be replaced by a vapour which boils at the predetermined temperature as described with reference to FIG. 5.

Figure 7:
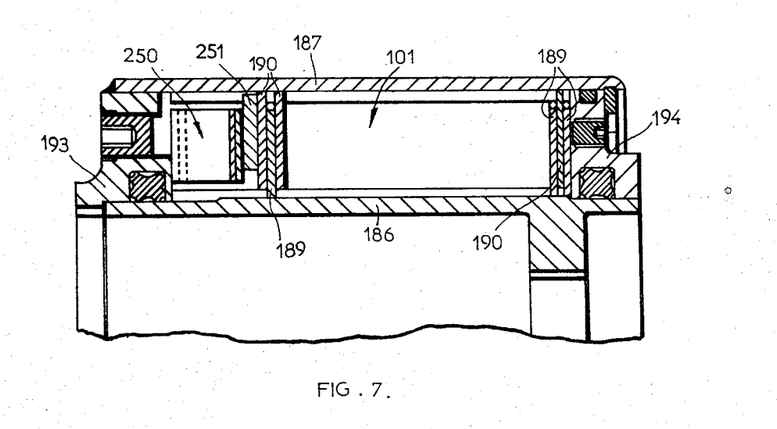
FIG. 7 is a longitudinal section of part of a viscous shear coupling arrangement for use in a four-wheel-drive vehicle in accordance with the present invention.

FIG. 7 shows a further alternative form of the present invention in which the inner and outer cylindrical elements 186 and 187 of FIG. 6 are interconnected solely by a viscous shear coupling 101 similar to that shown in FIG. 6. In the arrangement shown in FIG. 7 the discs of the viscous shear coupling are arranged to be displaced axially on their keys by a bimetallic temperature sensitive element 250 which acts on the end of the discs via a thrust ring 251 which is keyed to the outer cylindrical element 187. The bimetallic element 250 acts between the end wall 193 and the thrust ring 251 and, as shown in FIG. 8, comprises a corrugated/ring, the corrugations projecting axially relative to the discs of the coupling so that as the temperature of the coupling rises the corrugations deepen and the discs of the coupling are brought closer together or into frictional engagement thus increasing the torque transmitted through the coupling from the rear to the front wheels of the vehicle.

Figure 8:
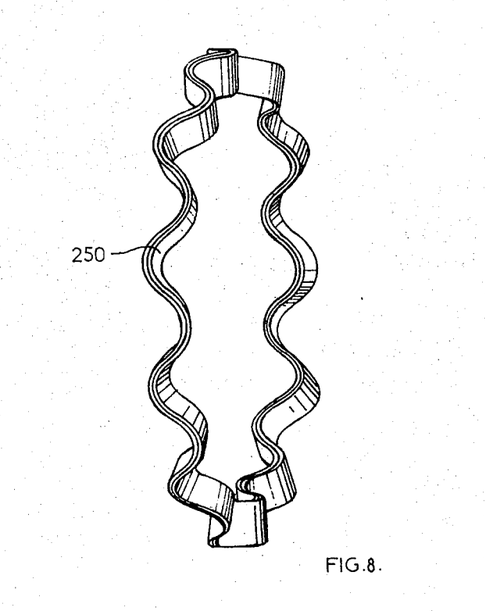
FIG. 8 is a perspective view of a bimetallic temperature sensitive element used in the arrangement shown in FIG. 7.

The bimetallic temperature sensitive element shown in FIGS. 7 and 8 can be used, if desired, in place of the encapsulated wax or vapour arrangements described previously with reference to FIGS. 5 and 6. Similarly the encapsulated wax and vapour temperature sensitive elements described previously with reference to FIGS. 5 and 6 can be used if desired in place of the bimetallic ring in the arrangement shown in FIG. 7.

If desired, the various viscous shear coupling arrangements described above with reference to FIGS. 7 and 8 can also be used in combination with a differential unit, the viscous shear coupling being connected between the two outputs of the differential in a similar manner to the shear coupling 84 shown in FIG. 5.

Figure 9A:
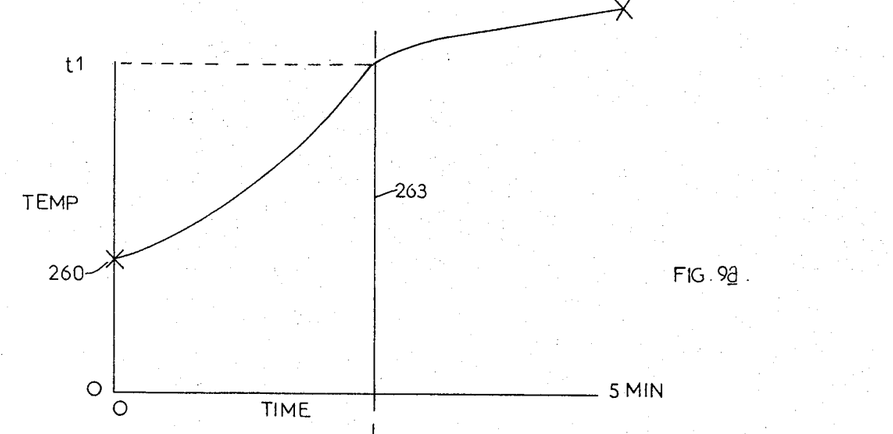
FIGS. 9a, 9b and 9c are three graphs showing respectively, plotted against time, the temperature of the torque transmitting device used in a four-wheel-drive vehicle in accordance with the present invention, the speed difference between the front and rear wheels of the vehicle, and the brake horse-power dissipated in the device under conditions where the device has to provide reaction continuously.
Figure 9B:
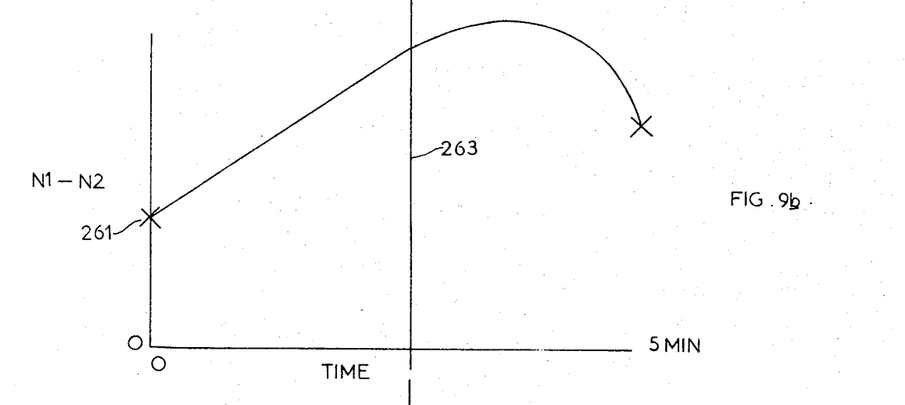
Figure 9C:
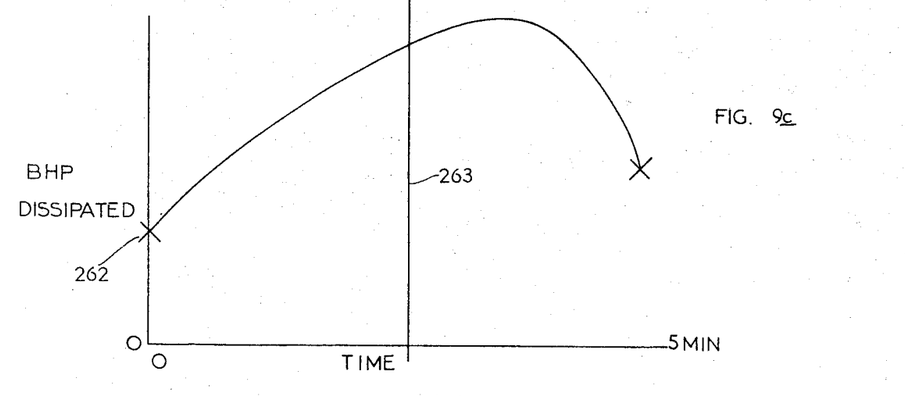

Further explanation of the invention will be made with reference to FIG. 9a, to 9c. In a four-wheel-drive vehicle in which there is an inter-axle differential and associated therewith a torque transmitting device to control the speed difference between the front and rear wheels, the driving torque will be split between the front and rear wheels during normal operation. The front and rear wheels will normally be rotating at approximately the same speed. The torque transmitting device will only have to control the speed difference between the front and rear wheels instantaneously during normal operation of the vehicle. For example, if the vehicle crosses a patch of ice then the torque transmitting device may be brought into operation. It is where the torque transmitting device is brought into operation continuously that the invention acts to prevent damage to the device. Thus, referring to FIGS. 9a to 9c, the points 260, 261 and 262 on the graphs of FIGS. 9a, 9b and 9c, indicate what could be a normal transient condition. If now the torque transmitting device has to operate continuously, if, for example, one pair of wheels is stuck in a ditch as described above, and the driver continues to run the engine and apply torque to the axles, the one pair of wheels will be spinning freely and the temperature of the torque transmitting device will thus start to rise as shown in FIG. 9a as time passes. As the temperature rises, assuming that the torque transmitting device is in the form of a viscous shear coupling, the viscosity of the fluid in the coupling will fall and assuming that there is a constant torque transmitted the speed difference between the members of the viscous shear coupling will increase as shown in FIG. 9b. Since the torque transmitted is constant, the brake horse power dissipated in the device will also increase as shown by FIG. 9c.

At a predetermined temperature $t_1$ as shown in FIG. 9a, action will be taken to reduce the amount of energy dissipated in the device by, for example, moving the members or plates of the device closer together. The instant of operation of the device is indicated by the line 263.

Since the plates of the device are moved closer together then the same amount of torque can be transmitted with a decreased speed difference and therefore after a time lag the speed difference decreases as shown in FIG. 9b. Simultaneously, the brake horse power dissipated in the device decreases since the torque is maintained constant. The temperature of the device will be controlled but there may be a slight rise as shown in FIG. 9a.

It will be seen from the foregoing that the invention provides a four-wheel-drive vehicle of the kind specified in which the temperature in the torque transmitting device can be controlled, thus avoiding the danger of damage due to overheating which is expensive to repair.

I claim:

1. A four-wheel-drive vehicle including a prime mover, front and rear wheels drivable by the prime mover, a drive connection between the front and rear wheels, a torque transmitting device having two relatively rotatable parts arranged so that the ratio of input torque to output torque of the device is not at all times equal to the ratio of output speed to input speed of the device, one of said parts of the device being connected with the front wheels and the other of said parts of the device being connected with the rear wheels so that when a speed differential arises between the front and rear wheels said parts of the device rotate relative to each other to transmit torque between the parts thus diverting part of the prime mover torque from the faster rotating wheels to the slower rotating wheels, a normally disengaged clutch connected kinematically in parallel with the torque transmitting device so as to provide an alternative torque transmitting path between the front and rear wheels, and a temperature sensitive element arranged, when the temperature of the torque transmitting device reaches a predetermined value resulting from relative rotation of said parts thereof in response to a speed differential between the front and rear wheels, to cause the clutch to engage, thus relieving the device of its torque transmitting duty and reducing the amount of energy converted into heat in the torque transmitting device.

2. A four-wheel-drive vehicle according to claim 1 in which the clutch comprises two series of interleaved annular discs, one series of discs being connected with the front wheels and the other series with the rear wheels, the temperature sensitive element being arranged to cause the discs to be displaced axially into frictional engagement when the temperature of the torque transmitting device reaches the predetermined value.

3. A four-wheel-drive vehicle according to claim 2 in which the temperature sensitive element comprises an expansible chamber containing a higher paraffin wax, the wax being arranged to expand thus bringing the clutch discs into frictional engagement when the temperature of the torque transmitting device reaches the predetermined value.

4. A four-wheel-drive vehicle according to claim 2 in which the temperature sensitive element comprises an expansible chamber containing a vapour, the vapour being arranged to boil thus expanding and bringing the clutch discs into frictional engagement when the temperature of the torque transmitting device reaches the predetermined value.

5. A four-wheel-drive vehicle according to claim 2 in which the temperature sensitive element comprises a bi-metallic element arranged to bear on one end of the interleaved series of clutch discs so as to bring the discs into frictional engagement when the temperature of the torque transmitting device reaches the predetermined value.

6. A four-wheel-drive vehicle according to claim 5 in which the bimetallic element is in the form of a corrugated ring, the corrugations projecting axially relative to the clutch discs so that as the temperature of the torque transmitting device reaches the predetermined value the corrugations deepen thus bringing the discs into frictional engagement.

7. A four-wheel-drive vehicle according to claim 1 in which the torque transmitting device comprises a viscous shear coupling comprising two series of interleaved annular discs operating in a viscous medium, one series of discs being connected with the front wheels and the other series with the rear wheels.

8. A four-wheel-drive vehicle according to claim 7 in which the viscous shear coupling is associated with a differential unit having an input and two outputs, the input being connected with the prime mover and the outputs being connected one with the front wheels and the other with the rear wheels of the vehicle, the viscous shear coupling being arranged to restrict the freedom of the differential outputs to rotate relative to each other.

* * * * *